United States Patent [19]

Sudol et al.

[11] Patent Number: 4,691,927
[45] Date of Patent: Sep. 8, 1987

[54] TEMPERATURE-COMPENSATING MECHANICAL FACE SEAL

[75] Inventors: Walter J. Sudol, Plaistow, N.H.; Michael P. Habich, North Reading, Mass.

[73] Assignee: A. W. Chesterton Company, Stoneham, Mass.

[21] Appl. No.: 936,326

[22] Filed: Dec. 1, 1986

[51] Int. Cl.$^4$ .............................................. F16J 15/36
[52] U.S. Cl. .................................. 277/26; 277/81 R; 277/88
[58] Field of Search .................. 277/81 R, 88–90, 277/96, 96.2, 26

[56] References Cited

U.S. PATENT DOCUMENTS

| | | | |
|---|---|---|---|
| 2,995,390 | 8/1961 | Gardner | 277/26 |
| 3,765,689 | 10/1973 | Adams | 277/26 |
| 3,776,560 | 12/1973 | Wentworth, Jr. | 277/88 |
| 4,261,581 | 4/1981 | Hershey | 277/26 X |

FOREIGN PATENT DOCUMENTS

| | | | |
|---|---|---|---|
| 2042098 | 9/1980 | United Kingdom | 277/26 |
| 804970 | 2/1981 | U.S.S.R. | 277/26 |
| 1065640 | 1/1984 | U.S.S.R. | 277/26 |

Primary Examiner—Robert S. Ward

[57] ABSTRACT

In a mechanical face seal of the diaphragm bellows type having a face seal ring with a body defining a substantially flat, annular sealing surface, and a holder adapted to be disposed radially about the seal ring in interference fit with a loaded surface of the seal ring, the holder defining a shoulder surface for engaging upon a corresponding shoulder surface of the face seal ring, the holder positioning the seal ring for sealing engagement with an opposed sealing surface of a relatively rotating second seal ring, and the holder defining a loading surface adapted to apply radially inwardly directed contact pressure upon the opposed loaded surface of the face seal ring, the face seal ring and the holder having different coefficients of thermal expansion, contact pressure applied by the holder upon the face seal ring is applied to an area of the face seal ring loaded surface, the resultant of the contact pressure being disposed axially between the sealing surface and the centroid of the face seal ring thereby to cause the sealing surface to lie substantially flat at varying temperatures of operation.

11 Claims, 4 Drawing Figures

TEMPERATURE-COMPENSATING MECHANICAL FACE SEAL

The invention relates to a mechanical face seal of the diaphragm bellows type for providing a fluid-tight seal between a rotating shaft and a stationary housing, useful, e.g., in applications such as pumps.

A mechanical face seal consists of two seal rings, one rotating relative to the other, and supporting hardware. Each seal ring has one face, termed the seal face, lapped to extreme flatness to prevent the leakage of fluid between it and the opposing seal face. Carbon-graphite is commonly used as the narrower of the two seal rings, because of its self-lubricating properties. It is, however, subject to fracture when subjected to localized loading or when placed in tensile stress, as when internally pressurized. (The same is true of other common seal ring materials, including ceramics such as aluminum oxide and silicon carbide and cemented carbides such as tungsten carbide.) For this reason, a common method of constructing a mechanical face seal is to shrink fit or press fit a seal ring into a metal holder, or retainer. The outside diameter of the seal ring is greater than the inside diameter of the recess provided in the holder, so that an interference is created when the parts are assembled. The amount of interference between the parts is selected to be small enough so that yield and fracture strengths of the materials are not exceeded, but must be sufficient to resist relative rotation or slippage between the seal ring and the holder. The metal holder provides a means of attaching the seal ring to its supporting hardware without localized loads and places the seal ring in compressive stress, reducing the probability of fracture. In the case of a welded metal bellows seal, the holder is welded directly to one end of the bellows.

The interference fit between parts made from materials with different coefficients of thermal expansion is affected by changes in the temperature of the assembled parts. Typical values of the coefficients of thermal expansion for common seal materials are $10 \times 10^{-6}/°$ F. for holder materials (usually austenitic stainless steels) and about $3 \times 10^{-6}/°$ F. for seal face materials, e.g., carbon. The difference in shrinkage or growth of the parts affects the actual amount of interference and changes the mutual reaction forces between them. In many prior art seal ring/holder designs, this variation of mutual reaction substantially affects the seal ring face flatness.

Wentworth Jr. U.S. Pat. No. 3,776,560 shows a typical prior art interference fit seal ring and holder construction (FIG. 6).

Adams U.S. Pat. No. 3,765,689 and Hershey U.S. Pat. No. 4,261,581, both assigned to Durametallic Corporation, show seal ring and holder constructions in which the holder engages the outer annular surface of the seal ring in essentially point contact at substantially the central transverse plane of the seal ring causing reduced distortion of sealing surface flatness.

The objectives of this invention are to provide a mechanical face seal having one or more of the following features: minimal sealing surface distortion under varying temperatures of operation; distribution of contact force between holder and seal ring over an area large enough to prevent yielding or fracture of holder or seal ring; construction preventing leakage of fluid between the holder and seal ring; adequate frictional driving force to prevent rotation of the seal ring in the holder; proper axial support and location for the seal ring in the holder; an attachment point on the holder to which the end plate of the bellows can be welded; adequate protrusion of the seal ring from the holder to allow wear of the sealing surface without contact of the holder with the opposing seal face; support for the plate of the bellows nearest the holder when the bellows plate is deformed by pressure; and providing a mechanical face seal of size to fit within the limited radial space available in typical process pumps.

SUMMARY OF THE INVENTION

According to the invention, in a mechanical face seal of the diaphragm bellows type comprising a face seal ring having a body defining a substantially flat, annular sealing surface, and a holder adapted to be disposed radially about the face seal ring in interference fit with a loaded surface of the seal ring, the holder defining a shoulder surface for engaging upon a corresponding shoulder surface of the face seal ring, the holder positioning the face seal ring for sealing engagement with an opposed, sealing surface of a relatively rotating, second seal ring, and the holder defining a loading surface adapted to apply radially inwardly directed contact pressure upon the opposed loaded surface of the face seal ring, the face seal ring and the holder having different coefficients of thermal expansion, there is an improvement wherein the contact pressure applied by the holder upon the face seal ring is applied to an area of the seal ring loaded surface, the resultant of the contact pressure being disposed axially between the sealing surface and the centroid of the face seal ring thereby to cause the sealing surface to lie substantially flat at varying temperatures of operation.

In preferred embodiments, the radial thickness of a portion of the holder adjacent the sealing surface is generally greater than the radial thickness of a portion of the holder more spaced from the sealing surface, whereby the centroid of the holder is displaced generally axially from the axial midpoint of the holder in a direction generally toward the sealing surface; the face seal ring further comprises an integral body extension extending generally axially of the face seal body at a location spaced generally axially from the sealing surface, whereby the centroid of the integral body-and-extension lies generally axially spaced from the centroid of the body of the seal ring in a direction generally away from the sealing surface, preferably the body extension is disposed at least in part axially beyond the shoulder surface, away from the sealing surface, and preferably a surface of the body extension of the face seal ring is adapted to provide support for one end of the bellows; the body of the face seal ring defining the sealing surface extends axially beyond the holder in a manner to permit wear from the sealing surface against an opposed, relatively rotating sealing surface without interfering contact of the opposed, relatively rotating sealing surface with the holder; and the holder at the point of affixation to the bellows is of sufficiently small mass to permit joining the bellows to the holder by welding without burn through.

According to another aspect of the invention, in a face seal ring for use in a mechanical face seal of the diaphragm bellows type including a seal ring holder, the face seal ring comprising a body defining a substantially flat, annular sealing surface, a loaded surface adapted for engagement in interference fit by a surrounding surface of the holder, and a shoulder surface adapted for engagement by a shoulder surface of the holder, the holder adapted to position the face seal ring for sealing engagement with an opposed surface of a relatively rotating, second seal ring, the face seal ring having a coefficient of thermal expansion different from that of the holder, there is an improvement wherein the loaded surface of the face seal ring is adapted to receive contact pressure from the loading surface of the holder, the resultant of the contact pressure being disposed axially between the sealing surface and the centroid of the face seal ring thereby to cause the sealing surface to lie substantially flat at varying temperatures of operation.

In preferred embodiments of this aspect of the invention, the face seal ring further comprises an integral body extension extending generally axially of the face seal body at location spaced generally axially from the sealing surface, whereby the centroid of the integral body-and-extension lies generally axially spaced from the centroid of the body of the seal ring in a direction generally away from the sealing surface; the extension is disposed at least in part axially beyond the shoulder surface, away from the sealing surface; and the body of the face seal ring defining the sealing surface extends axially beyond the holder in a manner to permit wear from the sealing surface against an opposed, relatively rotating sealing surface without interfering contact of the opposed, relatively rotating sealing surface with the holder.

Other features and advantages of the invention will be understood for the following description of a presently preferred embodiment, and from the claims.

PREFERRED EMBODIMENT

We first briefly describe the drawings.

DRAWINGS

Figure 1:
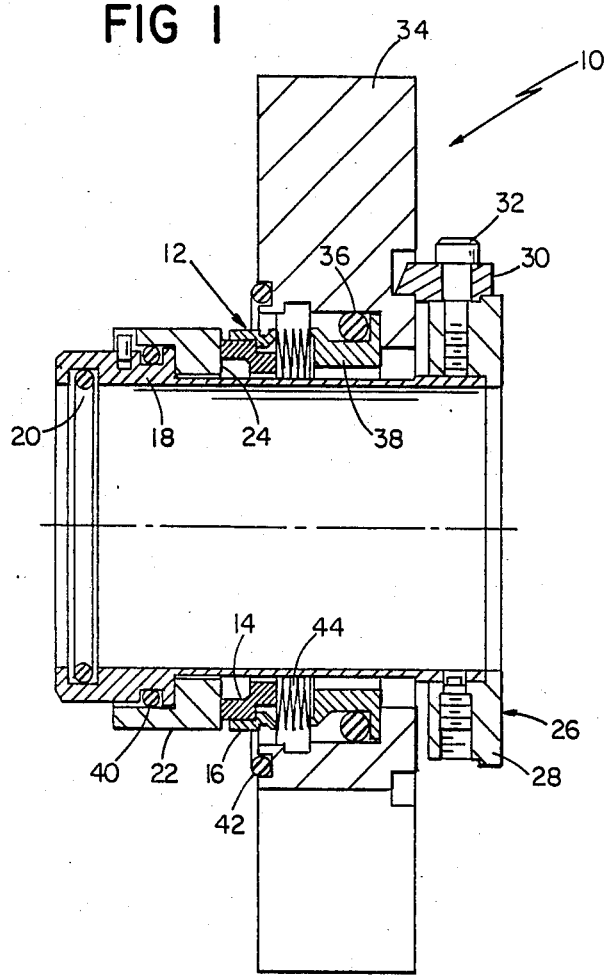
FIG. 1 is a side section view of a seal assembly employing the mechanical face seal of the invention.

Referring to FIG. 1, a mechanical face seal assembly 10, for providing sealing of pressurized fluid between a stationary surface, e.g., the wall of a pump, and a moving surface, e.g., a pump shaft, includes a bellows assembly 12 with a stationary face seal ring 14 and holder 16 of the invention. The seal assembly 10 further includes a sleeve 18, sealed about its inner surface by o-ring 20, upon which is mounted rotary seal ring 22, formed, e.g., of reaction bonded silicon carbide, and having a lapped sealing surface 24 of extreme flatness. The assembly 10 also includes lock ring assembly 26, consisting of lock ring 28 and centering clips 30 mounted by cap screws 32. The centering clips engage gland 34. Additional sealing between components is provided by o-ring 36 (gland to end fitting 38 of bellows assembly 12), o-ring 40 (rotary seal ring to sleeve), and o-ring 42 on the face surface of gland 34.

Figure 2:
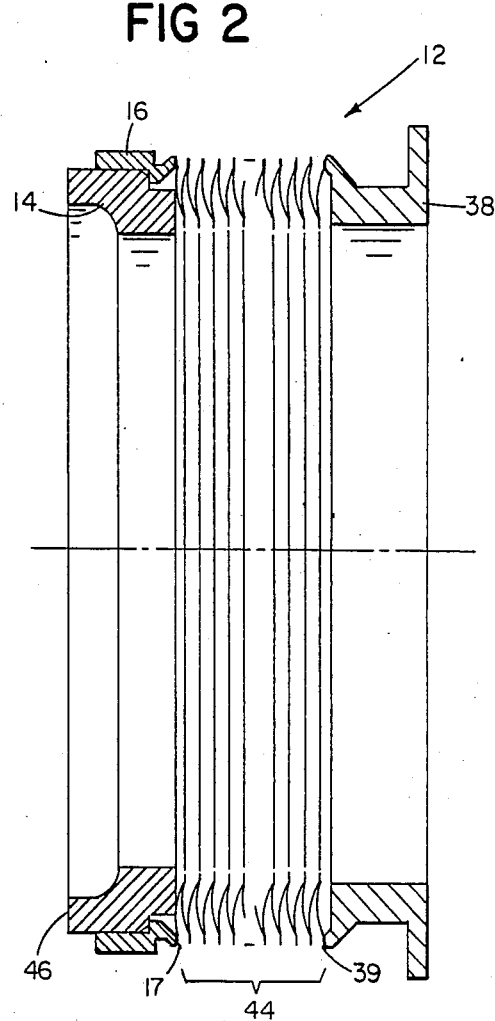
FIG. 2 is an enlarged side section view of a mechanical face seal of the diaphragm bellows type.

Referring also to FIG. 2, the bellows assembly 12 consists of a conventional metal bellows core 44 extending between end fitting 38 and holder 16. The bellows core is formed of a plurality of metal bellows plates, each ring fastened to its adjacent plates, one completely about the outer periphery, the other completely about the inner periphery, with the bellows plates at the ends respectively attached, e.g., by welding, to the end fitting and holder to provide a flexible yet fluid-tight seal therebetween. The body portions defining the respective attachment surfaces of the holder (surface 17 (FIG. 4)) and end fitting (surface 39) are of relatively small mass to allow welding of the thin bellows plates to the more massive holder and end fitting without burn through.

Figure 3:
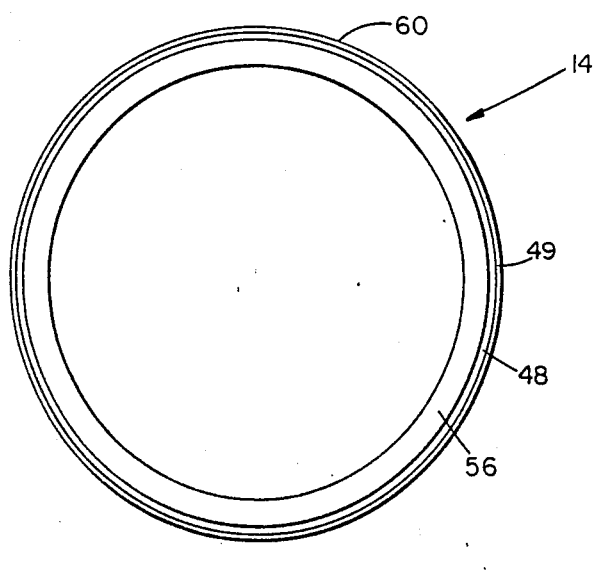
FIG. 3 is a rear plan view of the seal ring of the invention.

Mounted in holder 16 is a stationary face seal ring 14 (shown in rear plan view in FIG. 3), formed, e.g., of carbon, having a sealing surface 46 lapped to be substantially flat, e.g., to a tolerance of two helium light bands. In the seal assembly 10, the sealing surface 46 of stationary seal ring 14 mounted in holder 16 is urged into sealing contact with the sealing surface 24 of rotary seal ring 22 by the resilience of bellows core 44.

Figure 4:
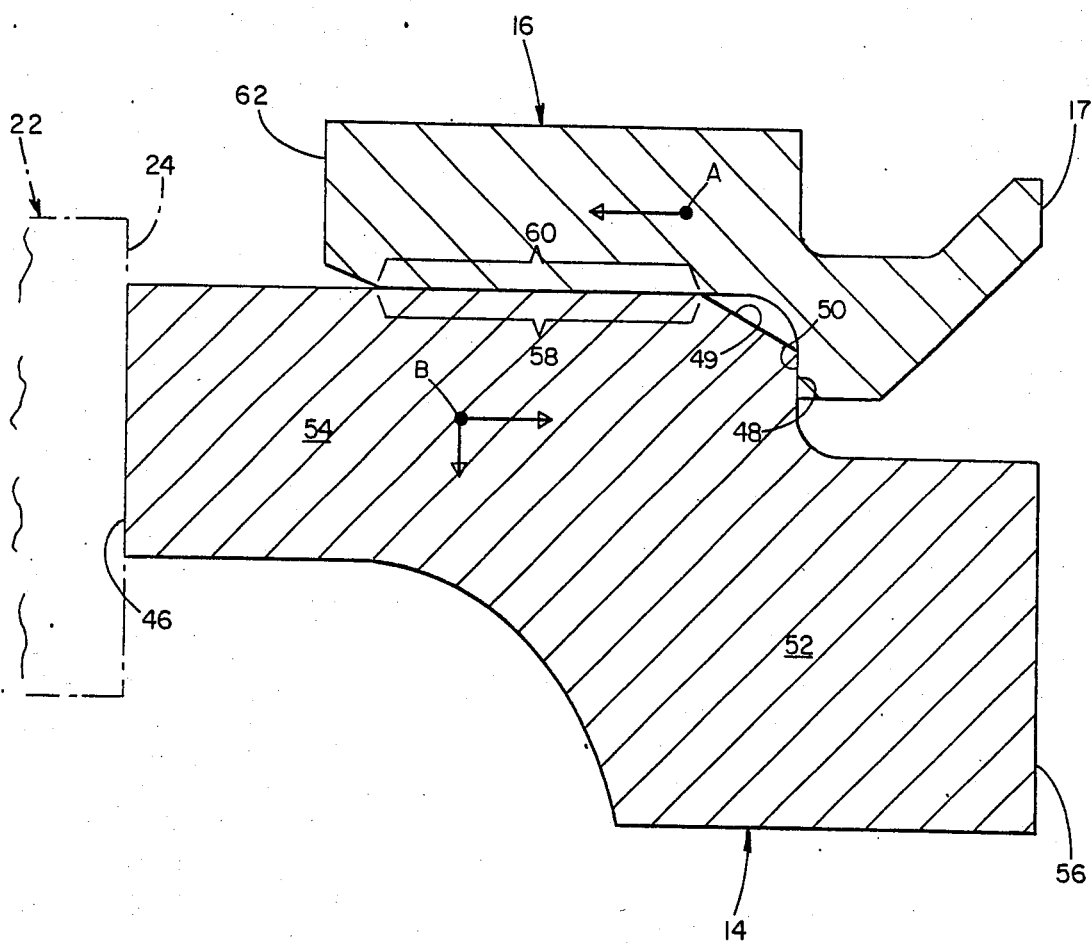
FIG. 4 is a much enlarged side section view of the face seal ring and holder of the invention.

Referring now to FIG. 4, to provide an acceptable level of sealing between the stationary sealing surface 46 of stationary seal ring 14 and the rotating sealing surface 24 of rotary seal ring 22, the opposed contacting surfaces must be maintained substantially flat. The respective seal rings are provided, e.g., by lapping, with sealing surfaces that initially are extremely flat.

The seal ring 14 is mounted into the holder 16 by press fit, until the shoulder surface 48 of the seal ring, below chamfer surface 49, is engaged upon the opposed shoulder surface 50 of the holder, with the integral extension 52 of the seal ring body 54 extending axially beyond the shoulder to a position where the rear end surface 56 of the seal ring is disposed to support the end bellows plate of bellows core 44 when the plate is deformed by pressure (the middle plates are supported by their neighbors, the opposite end plate is supported by the end fitting 38.)

As described above, the stationary seal ring 14 is mounted in holder 16 in interference fit between loading surface 58 of holder 16 and loaded surface 60 of seal ring 14, thus to place the carbon seal ring under compressive stress, thereby reducing the probability of fracture, and also to resist relative rotation or slippage between the face seal ring and the holder. The contact between the opposed surfaces of the holder and seal ring is caused to occur over an area (as opposed to a point contact) to distribute the applied pressure and to reduce the probability of yielding or fracture of either part. The area contact also provides an improved seal against leakage of fluid between the seal ring and holder, as can occur in systems where only point contact is provided.

The body 54 of the seal ring defining the sealing surface 46 extends beyond the corresponding end surface 62 of the holder to permit wear from the seal ring body-defining surface 46 without significant loss of sealing performance and without interfering contact of opposed rotary sealing surface 24 with the holder.

Due to the different coefficients of thermal expansion between the seal ring 14 and holder 16, as operating temperatures vary, distortion of the seal ring results, potentially resulting in distortion of the flatness of the sealing surface 46. However, we have discovered that by locating the resultant of the contact pressure of the loading surface 58 of the holder on the loaded surface 60 of the seal ring in the area between the centroid of the seal ring and the sealing surface, and keeping the contact area constant through changes in operating pressure and temperature, the effect of seal ring distortion upon the flatness of the sealing surface is minimized. (The flatness of the rear surface 56 of the seal ring extension may be substantially distorted, but this does not adversely affect sealing performance.) We recognize, however, that use of area contact between the holder and seal ring surfaces 58 and 60, elected for the advantages described above, conceivably allows the resultant of the applied contact pressure to occur anywhere in the contact area, depending on the shape of the loading distribution. To ensure that the resultant of contact pressure occurs in the desired region, i.e., between the centroid of the seal ring and the sealing surface, the position of loading and the location of the seal ring centroid are adjusted as compared to prior art systems. Specifically, the radial thickness of the portion of the holder from the vicinity of the shoulder and in the direction away from the sealing surface 46 is reduced as compared to the radial thickness of the portion of the holder nearer the sealing surface, whereby the centroid of the holder is displaced axially from the axial midpoint of the holder (indicated at A) toward the sealing surface. Also, the addition of the integral extension 52 of the seal ring 14 to the seal ring body 54 moves the centroid of the seal ring from the traditional point at the axial midpoint of the seal ring body (indicated at B), in the direction generally away from the sealing surface 46.

Other embodiments are within the following claims. For example, replacement seal rings according to the invention may be provided apart from the holder.

We claim:

1. In a mechanical face seal of the diaphragm bellows type, comprising:
   a face seal ring having a body defining a substantially flat, annular sealing surface, and
   a holder adapted to be disposed radially about said face seal ring in interference fit with a loaded surface of said seal ring, said holder defining a shoulder surface for engaging upon a corresponding shoulder surface of said face seal ring, said holder positioning said seal ring for sealing engagement with an opposed sealing surface of a relatively rotating, second seal ring, and said holder defining a loading surface adapted to apply radially inwardly directed contact pressure upon the opposed loaded surface of said face seal ring,
   said face seal ring and said holder having different coefficients of thermal expansion,
   the improvement wherein
   the contact pressure applied by said holder upon said face seal ring is applied to an area of said face seal ring loaded surface, the resultant of said contact pressure being disposed axially between said sealing surface and the centroid of said face seal ring thereby to cause the sealing surface to lie substantially flat at varying temperatures of operation.

2. The mechanical face seal of claim 1 wherein the radial thickness of a portion of said holder adjacent said sealing surface is generally greater than the radial thickness of a portion of said holder more spaced from said sealing surface, whereby the centroid of said holder is displaced generally axially from the axial midpoint of said holder in a direction generally toward said sealing surface.

3. The mechanical face seal of claim 1 wherein said face seal ring further comprises an integral body extension extending generally axially of said face seal body at a location spaced generally axially from said sealing surface, whereby the centroid of the integral body-and-extension lies generally axially spaced from the centroid of said body of said seal ring in a direction generally away from said sealing surface.

4. The mechanical face seal of claim 3 wherein said body extension is disposed at least in part axially beyond said shoulder surface, away from said sealing surface.

5. The mechanical face seal of claim 3 wherein a surface of said body extension of said face seal ring is adapted to provide support for one end of said bellows.

6. The mechanical face seal of claim 1 wherein the body of said face seal ring defining said sealing surface extends axially beyond said holder in a manner to permit wear from said sealing surface against an opposed, relatively rotating sealing surface without interfering contact of said opposed relatively rotating sealing surface with said holder.

7. The mechanical face seal of claim 1 wherein said holder at the point of affixation to said bellows is of sufficiently small mass to permit joining said bellows to said holder by welding without burn through.

8. In a face seal ring for use in a mechanical face seal of the diaphragm bellows type including a seal ring holder,
   said face seal ring comprising
   a body defining a substantially flat, annular sealing surface, a loaded surface adapted for engagement in interference fit by a surrounding surface of the holder, and a shoulder surface adapted for engagement by a shoulder surface of the holder, the holder adapted to position said face seal ring for sealing engagement with an opposed surface of a relatively rotating, second seal ring,
   said face seal ring having a coefficient of thermal expansion different from that of the holder,
   the improvement wherein
   said loaded surface of said face seal ring is adapted to receive contact pressure from the loading surface of the holder, the resultant of said contact pressure being disposed axially between the sealing surface and the centroid of the face seal ring thereby to cause the sealing surface to lie substantially flat at varying temperatures of operation.

9. The face seal ring of claim 8 wherein said face seal ring further comprises an integral body extension extending generally axially of said face seal body at a location spaced generally axially from said sealing surface, whereby the centroid of the integral body-and extension lies generally axially spaced from the centroid of said body of said seal ring in a direction generally away from said sealing surface.

10. The face seal ring of claim 9 wherein said extension is disposed at least in part axially beyond said shoulder surface, away from said sealing surface.

11. The face seal ring of claim 9 wherein the body of said face seal ring defining said sealing surface extends axially beyond the holder in a manner to permit wear from said sealing surface against an opposed, relatively rotating sealing surface without interfering contact of said opposed, relatively rotating sealing surface with the holder.

* * * * *